June 23, 1970　　　　　H. J. BRUCE　　　　　3,516,706
FREIGHT VEHICLES
Filed Oct. 25, 1967　　　　　　　　　　　　5 Sheets-Sheet 1
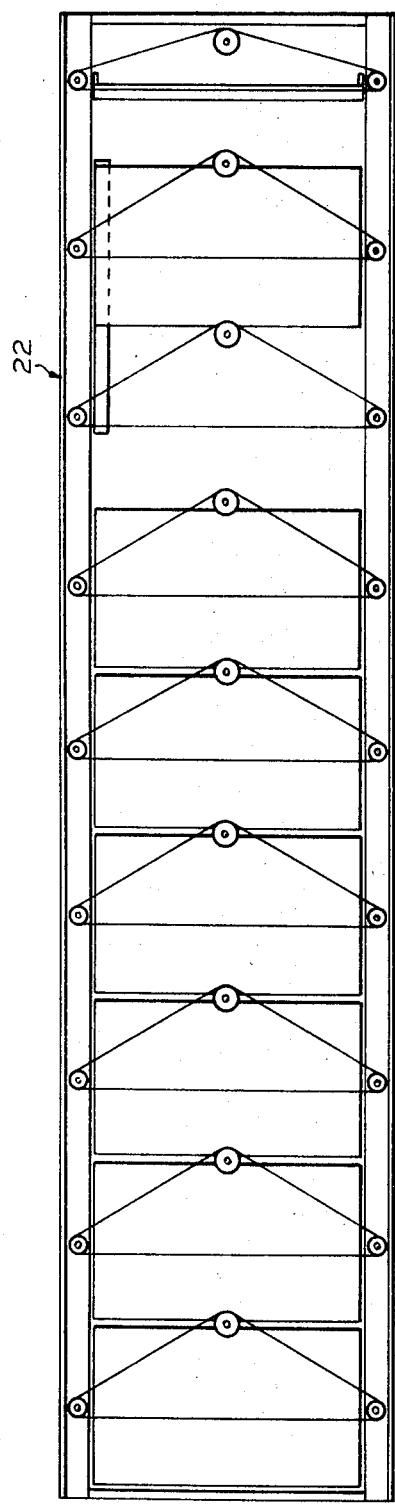
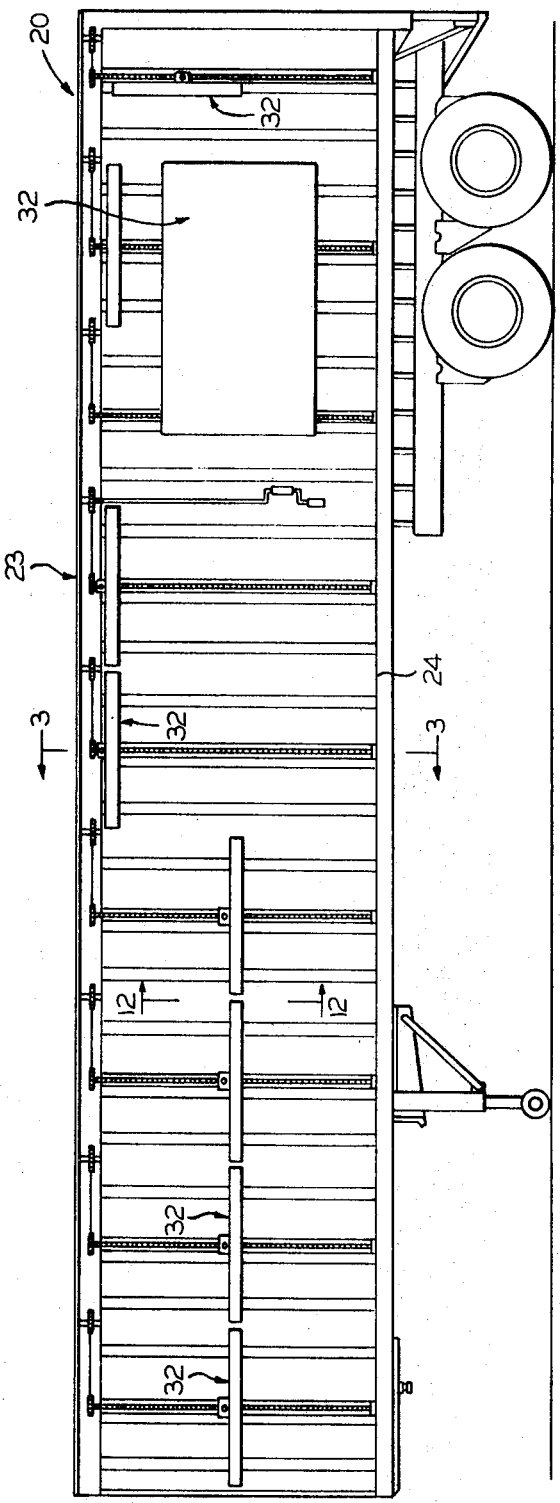
INVENTOR
HARRY J. BRUCE
BY *Max R. Kraus*
ATTORNEY June 23, 1970  H. J. BRUCE  3,516,706
FREIGHT VEHICLES Filed Oct. 25, 1967  5 Sheets-Sheet 2

INVENTOR
HARRY J. BRUCE

BY
Max R. Kraus
ATTORNEY

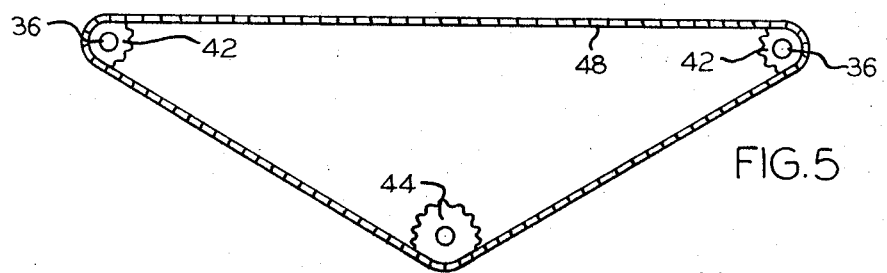
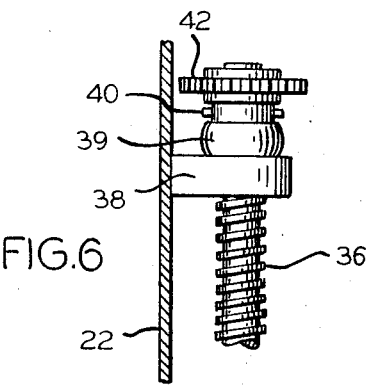
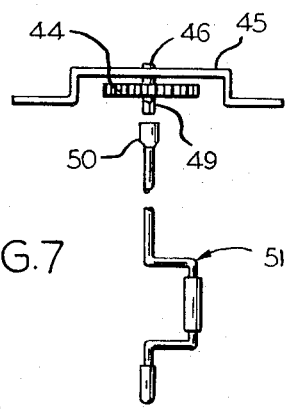
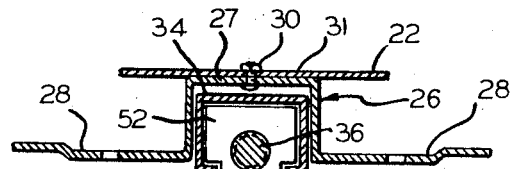
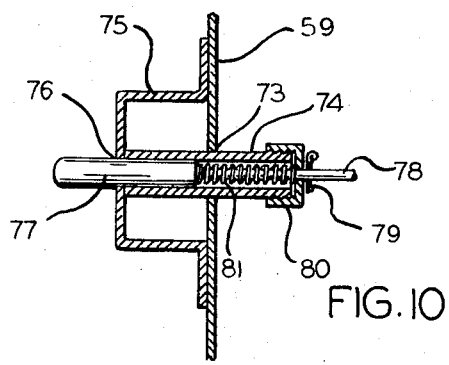
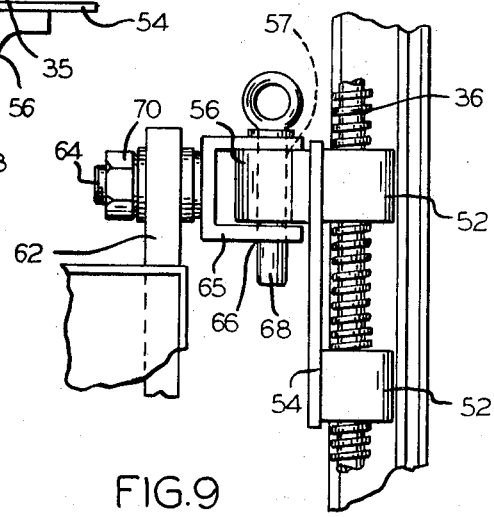
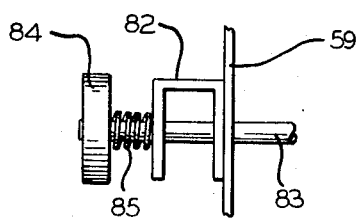
INVENTOR
HARRY J. BRUCE June 23, 1970  H. J. BRUCE  3,516,706
FREIGHT VEHICLES Filed Oct. 25, 1967  5 Sheets-Sheet 4

INVENTOR
HARRY J. BRUCE

BY
Max R. Kraus
ATTORNEY

June 23, 1970 H. J. BRUCE 3,516,706
FREIGHT VEHICLES

Filed Oct. 25, 1967 5 Sheets-Sheet 5

INVENTOR
HARRY J. BRUCE

BY
Max R. Kraus
ATTORNEY

United States Patent Office 3,516,706
Patented June 23, 1970

3,516,706
FREIGHT VEHICLES
Harry J. Bruce, Barrington, Ill., assignor to Spector Industries, Inc., Chicago, Ill., a corporation of Delaware
Filed Oct. 25, 1967, Ser. No. 678,022
Int. Cl. B60p *1/34*
U.S. Cl. 296—24                                          25 Claims

ABSTRACT OF THE DISCLOSURE

A freight vehicle provided with adjustable decks or platforms movable between the floor and ceiling of the vehicle whereby freight may be supported on said platforms when same are horizontally positioned; said decks or platforms are also capable of being pivoted to a vertical position wherein they serve as bulkheads and also wherein they may be pivoted to a position against and parallel with the side wall of the vehicle to be in an out-of-the-way position.

---

This invention relates to improvements in freight vehicles.

An object of this invention is to provide a freight vehicle, whether it be a truck, trailer, container, or a railroad car, with one or more decks or platforms which may be readily positioned at any desired elevation in horizontal position between the floor and roof of the vehicle to support freight loads off the floor of the vehicle.

Another object of this invention is to provide a deck which in addition to its horizontal positioning is readily pivotally moved to a vertical position to serve as a bulkhead, or may be moved to an out-of-the-way position so as not to occupy any storage space of the vehicle. The decks are readily adjustable and may be incorporated in standard freight vehicles without the reconstruction of such vehicles.

Another object of this invention is to provide a readily adjustable deck which is firmly and positively supported in any of its adjusted positions on positive locking and supporting means so that the deck can carry the full load of the freight supported thereon, without placing any stress or strain on the screw shafts which serve to elevate and lower the deck.

SUMMARY OF THE INVENTION

The invention comprises a freight vehicle having one or more separate adjustable decks or platforms, each independently operated. The decks are raised and lowered by rotating a pair of oppositely positioned screw shafts. Means are provided for locking and supporting the deck in its adjusted position without placing any strain or stress on the screw shafts. Each deck is also pivotally supported about a horizontal and vertical axis to permit the deck to be moved from a horizontal to a vertical position and to be moved to a position against and parallel with the side wall of the vehicle.

BRIEF DESCRIPTION OF THE DRAWINGS

In the drawings:
FIG. 1 is a side elevational view with one side of the trailer body removed to show the interior and with the movable decks or platforms in various positions to illustrate the positions in which each platform or deck may be positioned.

FIG. 2 is a top plan view showing the sprocket drive chain and the sprockets by which the screw shafts are rotated for raising and lowering the deck or platform.

FIG. 5 is a plan view showing the sprocket gears and the drive chain for operating each pair of screw shafts.

FIG. 6 is a detailed view showing the upper support for the screw shaft.

FIG. 7 is a view showing the central sprocket gear and the crank handle for rotating said sprocket gear and operating the screw shafts.

FIG. 8 is a top sectional view showing the screw shaft and the means connecting the movable deck or platform thereto.

FIG. 9 is an end view showing the pivoting means for supporting the deck or platform for pivoting about a horizontal as well as a vertical axis.

FIG. 10 is a top sectional view showing the details of the retractable pin on the deck or platform.

FIG. 11 is a view showing the details of the retractable rollers on the deck or platform.

DESCRIPTION OF THE PREFERRED EMBODIMENT

Figure 3:
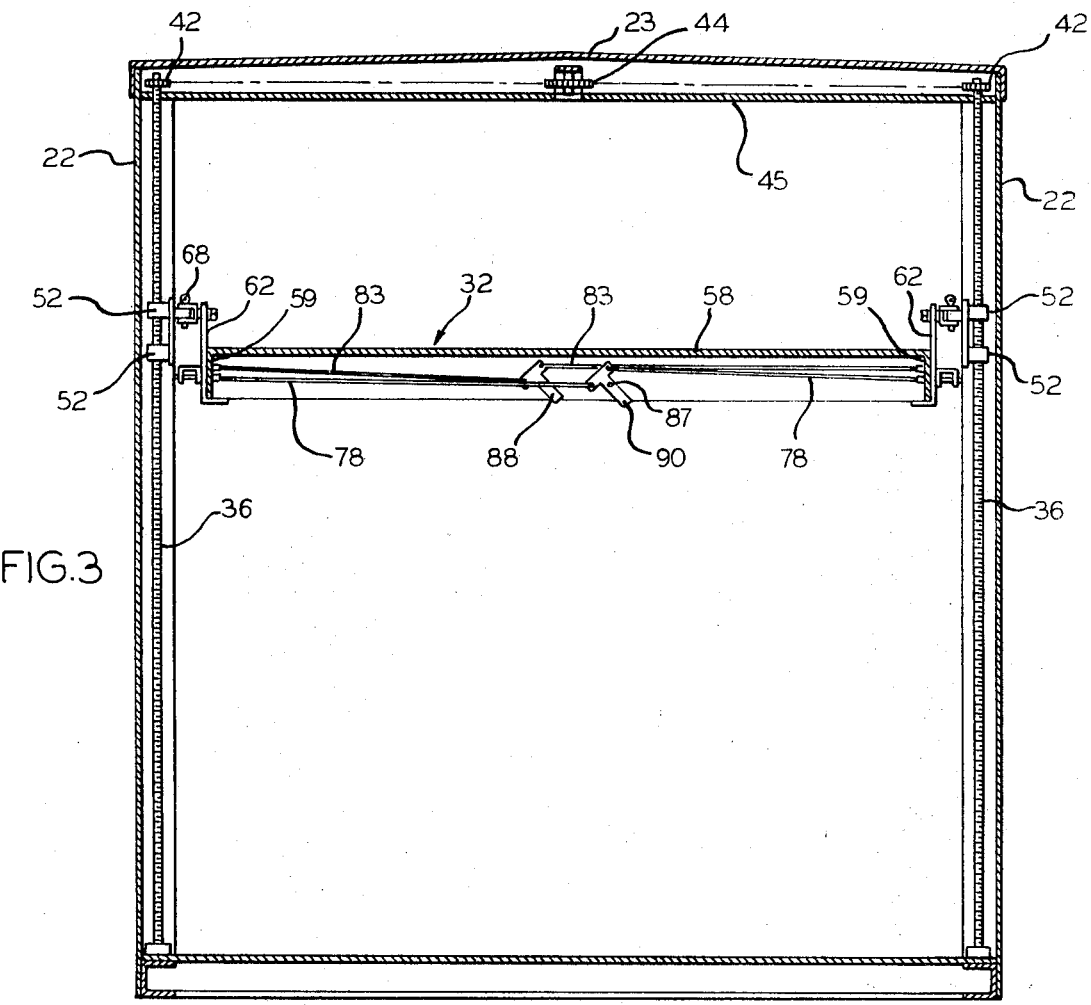
FIG. 3 is a view partly in section taken on lines 3—3 of FIG. 1, showing the movable deck and the means for locking same in a horizontal position.

The freight vehicle may be either a trailer as part of a motor vehicle, or it may be a container or freight railroad car. For the purpose of illustration the invention is shown in connection with a motor vehicle freight trailer but is not limited thereto.

The freight vehicle body, indicated generally by the numeral 20 consists of spaced side walls 22, a roof 23, and a floor or stationary lower deck 24. The body 20 is supported by the conventional under-structure, not here described. To the inside of the body are secured hat section posts generally designated by the numeral 26. Each hat section post is shaped as best shown in FIG. 8 and is made preferably of metal and shaped to form a central vertically extending U-shaped channel 27, with oppositely extending walls or wings 28 extending outwardly from the central channel and spaced from the side walls 22 of the body. The hat section post 26 extends substantially the height of the body and is secured to the side wall 22 of the body by suitable fastening means 30 passing through the base wall 31 of the channel. The hat section posts 26 are positioned adjacent each other along the length of each side of the body. The hat section posts 26 on one side of the body are alined with those on the opposite side of the body.

Each deck or platform, which is generally designated at 32, cooperates with three hat section posts on each of the opposite sides of the body. Thus, each platform cooperates with six hat section posts. The intermediate post of the three posts will serve to accommodate the screw shaft and the opposite end posts of the three posts will serve to accommodate the retractable guide wheels and pins, all more presently to be described. The terms deck and platform are interchangeably used in this application and refer to the same structure.

FIG. 1 shows nine movable decks or platforms 32.

Each platform is independently operated, as will be hereinafter described. The operation of one movable deck and its cooperating mechanism will be described and same will be sufficient for the remaining decks as they are all identically constructed.

As viewed from the left of FIG. 1, the first four movable decks 32 have been adjusted to be centrally positioned between the floor and the roof of the body. The next two movable decks 32 have been elevated to the roof of the body. The next and last decks 32 are shown in vertical positions but at different elevations. In such vertical positions the decks serve as bulkheads. The deck 32 between the two vertically positioned decks is positioned adjacent the side wall of the body and parallel thereto. Each of the decks is capable of any of the adjustments and positioning, as shown by the various movable decks in FIG. 1, which are shown in the various positions for the purpose of illustrating what is capable of being accomplished with respect to each movable deck.

While all of the hat section posts 26 are similar, the three posts on each side which cooperate with a platform will, for the purpose of clarity, be identified as follows. The central of the three posts will be identified by the additional letter A and the remaining two posts will each be identified by the letter B.

Secured inside the channel 27 of the center hat section post A is a support channel designated by the numeral 34 (FIG. 8) which is generally of U-shaped configuration having inwardly extending flanges 35 adjacent the open end thereof. The support channel 34 is welded to the hat section post 26. A screw shaft 36 is positioned within the support channel 34 and the upper end of the screw shaft is supported as best shown in FIG. 6. A thrust block 38 is secured to the side wall 22 of the body. The screw shaft 36 is rotatably supported in said thrust block and extends upwardly thereof. A thrust washer 39 is positioned on the screw shaft. A pin 40 extends through an opening in the screw shaft. A sprocket gear 42 is fixedly mounted on the upper end of the screw shaft. Said sprocket gear when rotated will simultaneously rotate the screw shaft 36. The screw shaft may extend to adjacent the floor of the vehicle body and in any event the lower end of the screw shaft is supported in a thrust block (not shown), similar to thrust block 38. Thus, the screw shaft 36 is supported at both the top and bottom ends thereof.

A transverse or cross member 45 extends between the sides 22 of the body. A centrally positioned sprocket gear 44 (FIGS. 3 and 7) is fixedly secured to a rotatable shaft 46 which in turn is supported on the cross-member 45. As best seen in FIGS. 2 and 5, the sprocket gear 44 is positioned centrally and rearwardly of the two opposite sprocket gears 42, which in turn are each fixed to a screw shaft 36. The central sprocket gear 44 and the sprocket gears 42 are connected by a drive chain 48. The lower end of shaft 46 is squared or keyed as at 49 (FIG. 7) whereby it is detachably engaged by the socket portion 50 of a crank member 51 so that after the socket is in engagement with the shaft 46 and the crank 51 is rotated, the central sprocket gear 44 will through the drive chain 48 simultaneously rotate sprocket gears 42 fixed to the two oppositely positioned screw shaft 36, thereby simultaneously rotating the screw shafts.

Secured to each of the screw shafts 36 is a pair of traveler nuts 52 (FIGS. 8 and 9) which are spaced from each other and connected by a plate 54. The traveler nuts are rectangular in shape and move vertically within the support channel 34. They extend outwardly between the flanges 35 with the plate 54 being secured thereto. A bracket 56 is secured to the plate 54. The bracket 56 has a central opening 57. Rotation of the screw shaft 36 will cause the two traveler nuts 52 and plate 54 and bracket 56 to move upwardly or downwardly relative to the screw shaft 36, depending upon rotation of the screw shaft.

The platform or deck generally designated by the numeral 32 is pivotally secured, as will now be described, to the upper traveler nut 52 so that the platform or deck may be pivoted about a horizontal as well as a vertical axis. The platform (FIGS. 3 and 4) has a top deck 58, a pair of spaced depending side walls 59, and depending end walls 60. An L-shaped hanger 62 is secured to the sides 59 of the platform midway of the length thereof, with the vertical portion of the hanger extending upwardly of the top of the platform (FIGS. 3 and 9).

The hanger 62 is provided with a transverse opening adjacent the upper end through which extends a short shaft or bolt 64 connected to a U-shaped clevis 65 having spaced openings 66. The clevis 65 is secured to the bracket 56 with the openings 66 alined with the opening 57 of the bracket and is pivotally secured to the bracket by a pin 68. The hanger 62 is pivotally supported on the bolt 64 and is secured to the bolt by washers and a locking element 70.

Figure 12:
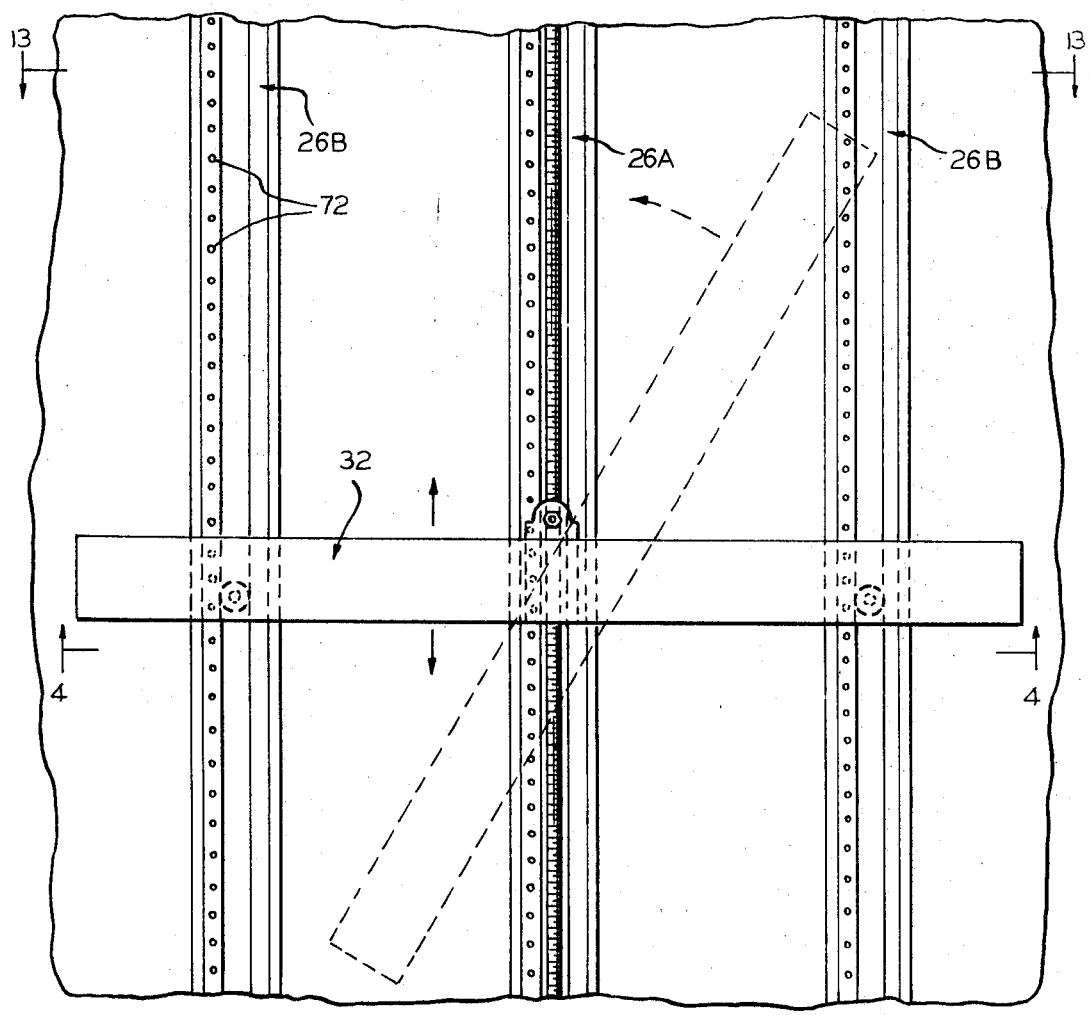
FIG. 12 is a view taken on line 12—12 of FIG. 2.
Figure 14:
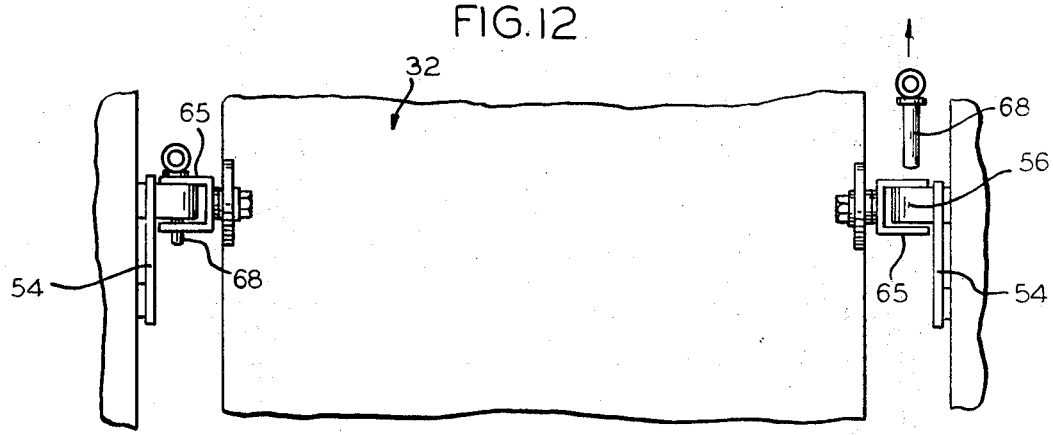
FIG. 14 is a plan view of the movable deck swung to a vertical position, with one of the hinge pins removed to permit the deck to be pivoted about the opposite pivot in a horizontal position against the side wall of the body.
Figure 13:
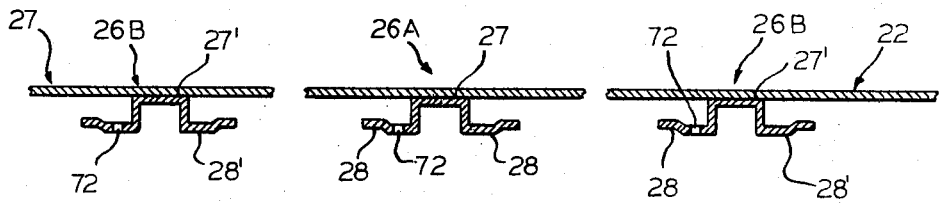
FIG. 13 is a sectional view taken on line 13—13 of FIG. 12.

The platform 32 is pivotally movable about the horizontal shaft 64 from the horizontal position, such as shown in FIG. 3, to a vertical position, such as shown in FIG. 13. The dotted line position of the platform 32 in FIG. 12 shows the platform being moved from the horizontal position to a vertically extending position. Likewise, the platform 32 may be moved into a vertical position against one of the side walls 22 of the body by removing one of the pins 68 and swinging the platform about the vertical axis of the opposite pin 68 so that it assumes a vertical position against the side wall, as shown in the right side of FIG. 1. While the platform 32 is raised and lowered through rotation of the vertical screw shafts 36, the platform is principally supported in its moved position by the structure now to be described.

Each platform has adjacent the front and rear ends, on each of its opposite sides, retractable pins and retractable rollers. When the platform 32 is adapted to be maintained in horizontal position the pins and rollers are in engagement with the hat section posts 26B. To lock the platform in a horizontal position the pins are utilized so that the platform is firmly supported on four pins. Therefore, the weight of the platform and everything supported thereon rests on the pins rather than on the vertical screw shafts 36.

Figure 4:
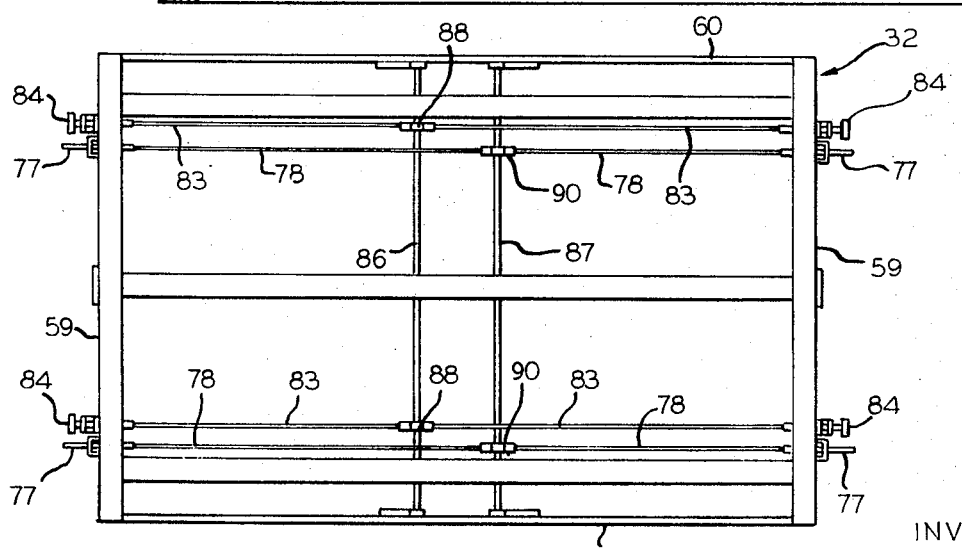
FIG. 4 is a bottom plan view taken on line 4—4 of FIG. 12, showing the underside of the platform or deck and the operating parts therewith.

FIGS. 10 and 11 show the details of the retractable pins and the retractable rollers which are secured to the platform, while FIG. 4 shows the relative position of same.

The hat section posts 26B with which the rollers and pins cooperate are similar in shape to the hat section post 26A previously described. The hat section posts B are shown in FIG. 12, with the cross-section shown in FIG. 13. The U-shaped channel of 26B is identified by the numeral 27′ and the laterally extending wing of the post is identified as 28′. The wing is provided with vertically alined spaced openings 72. The retractable pins engage said openings 72 to lock the platform and support it in its adjusted position. The channel 27′ receives the retractable rollers.

Referring to FIG. 10 which shows the retractable pin, the side wall 59 of the platform or deck 32 has an opening 73 which receives a sleeve or tubular member 74 which is fixedly secured to the side wall 59. A generally U-shaped support 75 is fixedly secured to the side wall 59 of the platform. It has an opening 76 alined with the sleeve 74. The sleeve or tubular member 74 supports therewithin a pin 77 which passes through the opening 76. Secured to the opposite end of the pin 77 inside of the sleeev is a cable 78 which extends through an opening 79 in the internally threaded cap 80 which is secured to the sleeve. A coil spring 81 surrounds the cable inside the sleeve, having one end resting against the pin and the other against the end wall of the cap for normally urging the pin outwardly in the direction shown in FIG. 10. The pin 77 when in the position shown in FIG. 10 is adapted to engage one of the openings 72 in the hat section posts 26B on the wall of the vehicle body. When the cable 78 is actuated, as will be presently described, the pin 77 is pulled inwardly against the bias of the spring 81 to retract same from the opening 72 with which it it in engagement.

Secured to the downwardly extending side walls 59 of the platform immediately adjacent the retractable pins is a roller, the details of which are best shown in FIG. 11. Also secured to the side wall 59 of the platform or deck 32 is a U-shaped support 82 which has openings alined with an opening in the side wall 59. A rod 83 extends through the alined openings and supports at its outer end a roller 84. A spring 85 is positioned on the rod 83 between the roller 84 and the support 82 to normally urge the rod and the roller outwardly in a direction away from the side wall of the platform. The rollers 84 ride in the channels 27' of the hat section posts 26B.

Each platform 32 has four retractable rollers 84 and four retractable pins 77, two pairs of which are positioned on each side of the platform, as best shown in FIG. 4, adjacent the opposite ends of the platform. Each pair of pins and rollers engage the same hat section post 26B, with the roller riding in the channel 27' thereof and the pin 77 engaging the vertical spaced openings 72 of said post.

The means for operating the cables 78 and the rods 83 which respectively operate the pins 77 and rollers 84 are best shown in FIGS. 3 and 4. Extending under the top deck 58 of the platform or deck 32 is a pair of spaced rods 86 and 87, the opposite ends of which are suitably supported on the front and rear end walls 60 of the platform or deck 32. The rod 86 has fixed to it a pair of T-shaped handle members 88 spaced from each other and each alined with the oppositely extending rods 83 connected to the rollers 84. Secured to the top portion of the T-shaped handle members 88 are the inner ends of the oppositely extending rods 83 which are connected to the retractable rollers 84. By manually engaging the handle 88 and rotating same, the oppositely extending rods 83 will be pulled inwardly to retract the retractable rollers 84 from the channels 27' of the hat sections 26B in which they are positioned. The retraction is against the bias of the spring 85 so that when the handle 88 is released the rollers 84 will be urged to their outward position.

Rod 87 supports a pair of T-shaped handle members 90 which are similarly connected to the inner ends of the opposite cables 78, which in turn are connected to the pins 77. Thus, by operating the handles 88 and 90 the pins 77 and rollers 84 are retracted from the hat section posts 26B. When the pins 77 and rollers 84 are retracted from the posts the platform 32 may be pivoted from the horizontal position shown in FIG. 12 to the vertical position shown in FIG. 13. In the vertical position it is locked against pivotal movement by pins 77 engaging openings 72 on the wing 28 of the hat section post 26A and the rollers 84 engaging the channel 27' thereof. When the platform is in horizontal position the rollers 84 will ride in the channels 27' of the hat sections 26B and the pins 77 will be in engagement with the openings 72 of the hat sections 26B.

When the pins 77 are in engagement with the openings 72, the platform 32 may not be raised or lowered while in its horizontal postion, therefore, in order to raise or lower the platform in its horizontal position the handles 90 are operated to retract the pins 77. With the pins 77 in retracted position the screw shafts 36 may be rotated to raise or lower the platform 32, with the rollers 84 riding in their respective channels 27'. When the desired elevation of the platform 32 is obtained, the handles 90 are released so that the pins engage the proper openings 72 with which they are aligned and the weight or load on the platform or deck 32 will be supported by said pins.

In lieu of the handles 88 and 90 shown for operating the retractable pins and rollers, the said handle members may be retained connected to their respective cables 78 and rods 83 and additional handles (not shown) may be fixedly secured to each of the opposite ends of the rods 86 and 87 so that by manually moving the additional handles the rods 86 and 87 are rotated to in turn operate the cables 78 and rods for retracting the pins and rollers.

If it is desire to move the platform from a horizontal to a vertical position both the pins and the rollers must be retracted so that the platform can be pivoted about the horizontal shaft 64 to the vertical position and locked in such vertical position, as previously described. When in vertical position the platform serves as a bulkhead. To move the platform 32 to a vertical position against and parallel with the side wall 22 of the vehicle body 20, such as shown in the right of FIG. 1, one of the pins 68 is withdrawn and the platform is then rotated about the opposite bracket 56 to permit its positioning. The pins 68 permit the platform or deck 32 to be mounted in the body 20 at any time desired and also removed therefrom.

This invention provides movable platforms in a vehicle body which may be elevated to any desired height between floor and roof and positioned horizontally to support loads. Likewise, the platforms may be readily positioned vertically to serve as bulkheads, or they may be moved to a vertical position against and parallel with the side wall of the vehicle body in out-of-the-way position.

While the decks 32 are made to pivot about horizontal and vertical axes, it will be understood that this invention embraces decks which are not so pivoted. This invention also cover a movable deck which is horizontally movable between the floor and roof by the elevating means and in which the deck is locked and supported in its moved horizontal position so that it supports the freight load on the deck without placing any strain or stress on the elevating means. The pivoting of the deck to a vertical position may be eliminated without departing from the invention herein.

DESCRIPTION OF MODIFICATION

Figure 15:
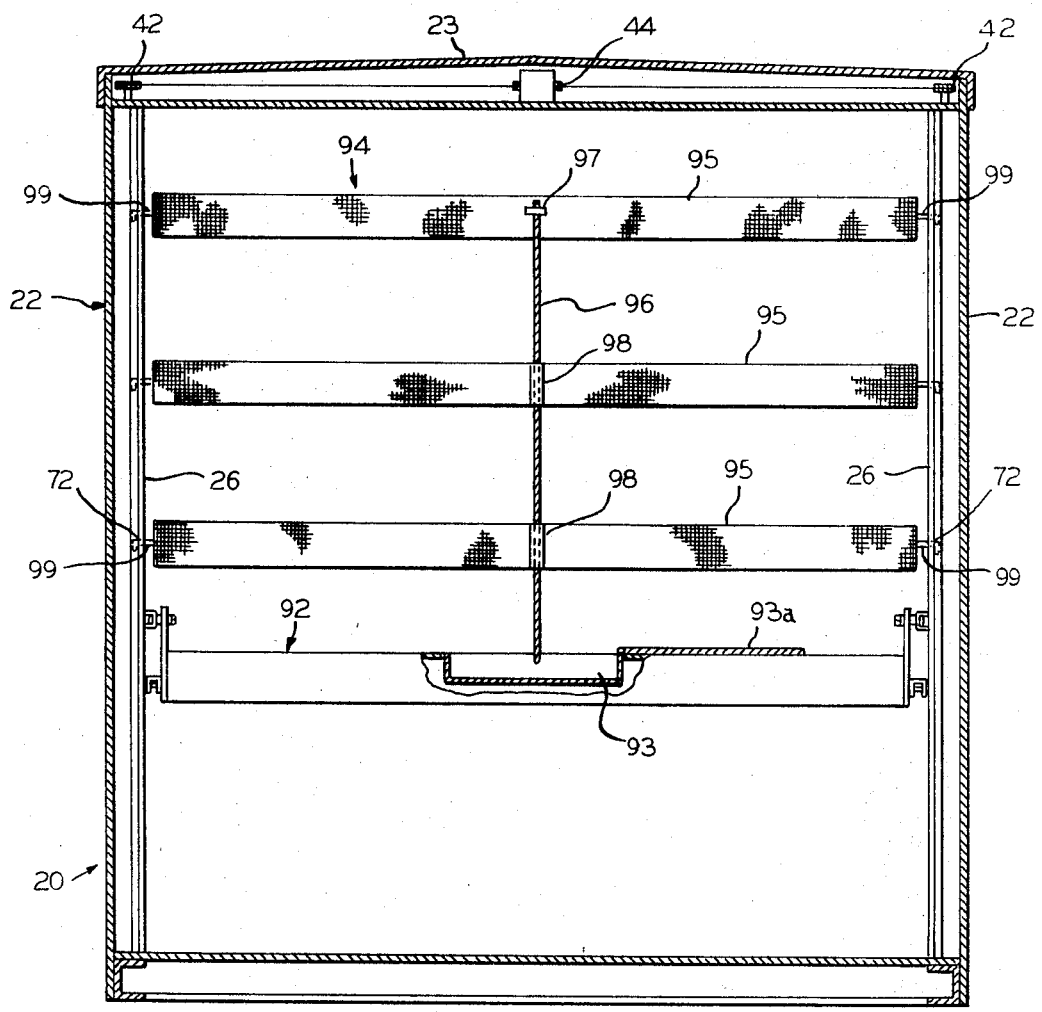
FIG. 15 is a view of a modification in which the deck has a webbing which is utilized to serve as a bulkhead while maintaining the deck in a horizontal position.

Referring to the modification shown in FIG. 15, the difference between that previously disclosed and the structure shown in FIG. 15 is in the use of a webbing connected to the platform or deck for the purpose of providing a vertically positioned member to serve as a bulkhead, while maintaining the deck in its horizontal position. The parts heretofore described are the same, except for the differences and additions herein pointed out.

The modified deck 92 is supported in the manner previously described with reference to deck 32. Deck 92 has a pocket 93 formed therein for housing or storing the webbing which forms the vertical member generally indicated at 94 when same is attached to the sides of the trailer, as shown. A trap door 93a closes the pocket 93. The vertical member 94 serves as a bulkhead in much the same manner as the deck 32 when positioned vertically. The vertically positioned member 94 is formed of a plurality of spaced flexible webbing strips 95 which are connected by a wire cable 96 anchored as at 97 to the outermost webbing strip. The wire cable passes through openings 98 in the other webbing strips. The bottom of the wire cable is anchored to the deck 92.

Fixedly secured to each of the opposite ends of the webbing strips 95 is a hook 99 which is detachably secured through the openings 72 in the wing of the hat section posts 26, previously described. When the webbing strips are thus secured to the hat section posts a vertical member 94 is provided, as shown in FIG. 15, which serves as a bulkhead, similar to the manner in which the deck serves when positioned vertically. The vertical member 94 thus can serve as a bulkhead with the deck in a horizontal position.

While the vertically positioned member 94 is shown positioned above the deck 92 it will be understood that it can be positioned to extend below the deck. The vertical member 94 may be readily collapsed by reason of the flexible webbing strips and same may be positioned in the pocket of the deck to be in an out-of-the-way position. To set it up it is readily removed or withdrawn from the pocket and secured as shown and described.

It will be understood that various changes and modifications may be made from the foregoing without departing from the spirit and scope of the appended claim.

I claim:

1. A freight vehicle body having spaced side walls and a floor and roof, a plurality of movable decks movable substantially between the floor and roof, a plurality of vertically extending screw shafts for each movable deck and connected to its respective deck, means for simultaneously rotating each plurality of vertically extending screw shafts for raising and lowering each deck independently of the other decks, and means for locking each deck and supporting same in any adjusted horizontal position so that the freight load is supported principally by said locking means.

2. A freight vehicle body having spaced side walls and a floor and roof, a movable deck movable substantially between the floor and roof and rotatable means for raising and lowering said deck, said deck being pivotally supported to permit it to be supported in a horizontal position and to be moved in a vertical position, said deck supporting a member which may be withdrawn therefrom and which is connected to the sides of the vehicle body to form a bulkhead.

3. A structure defined in claim 1 in which the deck has retractable pins adjacent the front and rear ends of the deck, with said pins engaging means on the side walls of the vehicle body to lock the deck in a horizontal position so that the freight load on the deck is supported by said pins.

4. A structure defined in claim 1 in which each of the screw shafts has a sprocket gear affixed thereto and in which a third sprocket gear is positioned intermediate the two screw shaft sprocket gears, all three of the sprocket gears being connected by a sprocket chain, and in which rotation of the intermediate sprocket gear simultaneously rotates the two oppositely positioned sprocket gears and the screw shafts.

5. A structure defined in claim 1 in which the deck has retractable guide means adjacent the front and rear ends of the deck, with said guide means engaging guide channels on the side walls of the vehicle body.

6. A structure defined in claim 1 in which the deck is pivotally supported to permit to be supported in a horizontal position and to be moved to a vertical position.

7. A structure defined in claim 1 in which the deck has a double pivotal movement, namely, wherein it may be moved or pivoted from a horizontal to a vertical position and may also be pivoted while in said vertical position to a position adjacent one of the side walls of the vehicle body parallel thereto to be in an out-of-the-way position so as not to interfere with the storage capacity of the vehicle body.

8. A structure as defined in claim 1 in which the decks are pivotally supported and capable of being pivoted in substantially vertical position transversely between the side walls of the vehicle body to serve as bulkheads.

9. A structure as defined in claim 1 in which the decks are pivotally supported and capable of being pivoted in a substantially vertical position adjacent to and parallel with one of the side walls of the vehicle body.

10. A freight vehicle body having spaced side walls and a floor and roof, a movable deck movable between the floor and roof and rotatable means for raising and lowering said deck, means for pivotally supporting said deck so that it may be moved to a vertical position adjacent to and parallel with one of the side walls of the vehicle body so as to be in an out-of-the-way position and not interfere with the storage capacity of the vehicle body, said deck having guide means and retractable pins adjacent the front and rear ends of the deck with said guide means and pins engaging means on the side walls of the vehicle body, said guide means serving to maintain the deck in a horizontal position while the deck is raised or lowered and said pins serving to lock the deck in a horizontal position so that the freight load on the deck is supported by said pins.

11. A structure as defined in claim 1 in which the deck has rollers extending outwardly of the sides of the deck and engageable with means on the side walls of the vehicle body.

12. A structure as defined in claim 1 in which the means for supporting the deck in adjusted horizontal position includes retractable members extending outwardly of the sides of the deck and engageable with means on the side walls of the vehicle body, and in which the deck has rollers extending outwardly of the sides of the deck and engageable with means on the side walls of the vehicle body.

13. A structure defined in claim 1 which pivotally supports the deck so that it may be moved to a vertical position adjacent to and parallel with one of the side walls of the vehicle body so as to be in an out-of-the-way position and not interfere with the storage capacity of the vehicle body.

14. A structure defined in claim 13 in which the deck has guide means and retractable pins adjacent the front and rear ends of the deck with said guide means and pins engaging means on the side walls of the vehicle body, said guide means serving to maintain the deck in a horizontal position while the deck is raised or lowered and said pins serving to lock the deck in a horizontal position so that the freight load on the deck is supported by said pins.

15. A structure as defined in claim 1 in which the means for locking each deck and supporting same in any adjusted horizontal position includes retractable members extending outwardly of the sides of the deck and engageable with means on the side walls of the vehicle body.

16. A structure as defined in claim 15 in which the retractable members are pins which are manually retractable and which when not in retracted position engage spaced openings on the side walls of the vehicle body.

17. A structure as defined in claim 1 in which one vertically extending screw shaft is connected to each side of the deck approximately centrally of the length of the deck with the latching means adjacent each of the opposite ends of the deck.

18. A structure as defined in claim 17 in which the deck is pivotally supported approximately centrally of the length of the deck to permit the deck to be positioned substantially vertically between the side walls of the vehicle body to serve as a bulkhead.

19. A freight vehicle body having spaced side walls and a floor and roof, a movable deck, means for moving said deck substantially between the floor and roof, means for locking and supporting said deck in any adjusted horizontal position so that the freight load is supported principally on said locking means, means for pivotally supporting said deck so that same is capable of being pivoted in a substantially vertical position transversely between the sides of the vehicle body to serve as a bulkhead.

20. A structure as defined in claim 19 in which the deck is pivotally supported and is capable of being pivoted in a vertical position adjacent to and parallel with one of the side walls of the vehicle body.

21. A structure as defined in claim 19 in which the means for moving the deck horizontally between the floor and the roof comprises a plurality of vertically extending screw shafts connected to the deck, and means for simultaneously rotating said screw shafts to raise or lower said deck.

22. A structure as defined in claim 19 in which the deck may also be pivoted vertically adjacent to either of the opposite side walls of the vehicle body and parallel thereto.

23. A structure as defined in claim 19 in which the deck is pivotally secured adjacent each of its opposite sides to the side walls of the freight vehicle by means of a clevis and a removable pin, which pin when removed permits the deck to be pivoted adjacent to and parallel with the side wall of the freight vehicle on the side opposite to that where the pin has been removed.

24. A structure as defined in claim 21 in which each side wall of the vehicle body is provided with three channels, with the two outermost channels having flanges with openings therein and with the screw shaft positioned in the central channel, and in which the deck has guide means adjacent the opposite ends which ride in the two outermost channels, and in which the deck has locking means engageable with the openings in the flanges of the two outermost channels.

25. A structure as defined in claim 19 in which the means for moving the deck between floor and ceiling includes a vertically extending screw shaft, one on each side of the deck, positioned centrally of the length of the deck, with the pivoting of the deck to a vertical position centrally of the length of the deck.

References Cited
UNITED STATES PATENTS

| | | | |
|---|---|---|---|
| 2,825,600 | 3/1958 | Macomber | 296—24 |
| 3,218,987 | 11/1965 | Michel | 296—24 |
| 3,405,661 | 10/1968 | Erickson | 296—24 X |
| 3,240,167 | 3/1966 | Podesta | 105—370 |
| 3,119,350 | 1/1964 | Bellinger | 105—370 X |
| 1,083,831 | 1/1914 | Holdaway | 105—370 |
| 2,561,927 | 7/1951 | Janeczko | 105—370 |

PHILIP GOODMAN, Primary Examiner

U.S. Cl. X.R.

105—370